June 23, 1964 P. FORTESCUE ETAL 3,138,535
NUCLEAR REACTOR HAVING TRANSFER MECHANISM
Filed Nov. 21, 1958 14 Sheets-Sheet 1

Inventors
PETER FORTESCUE
DAVID NICOLL
By
Evans, Anderson, Luedeka & Fitch
Atty's

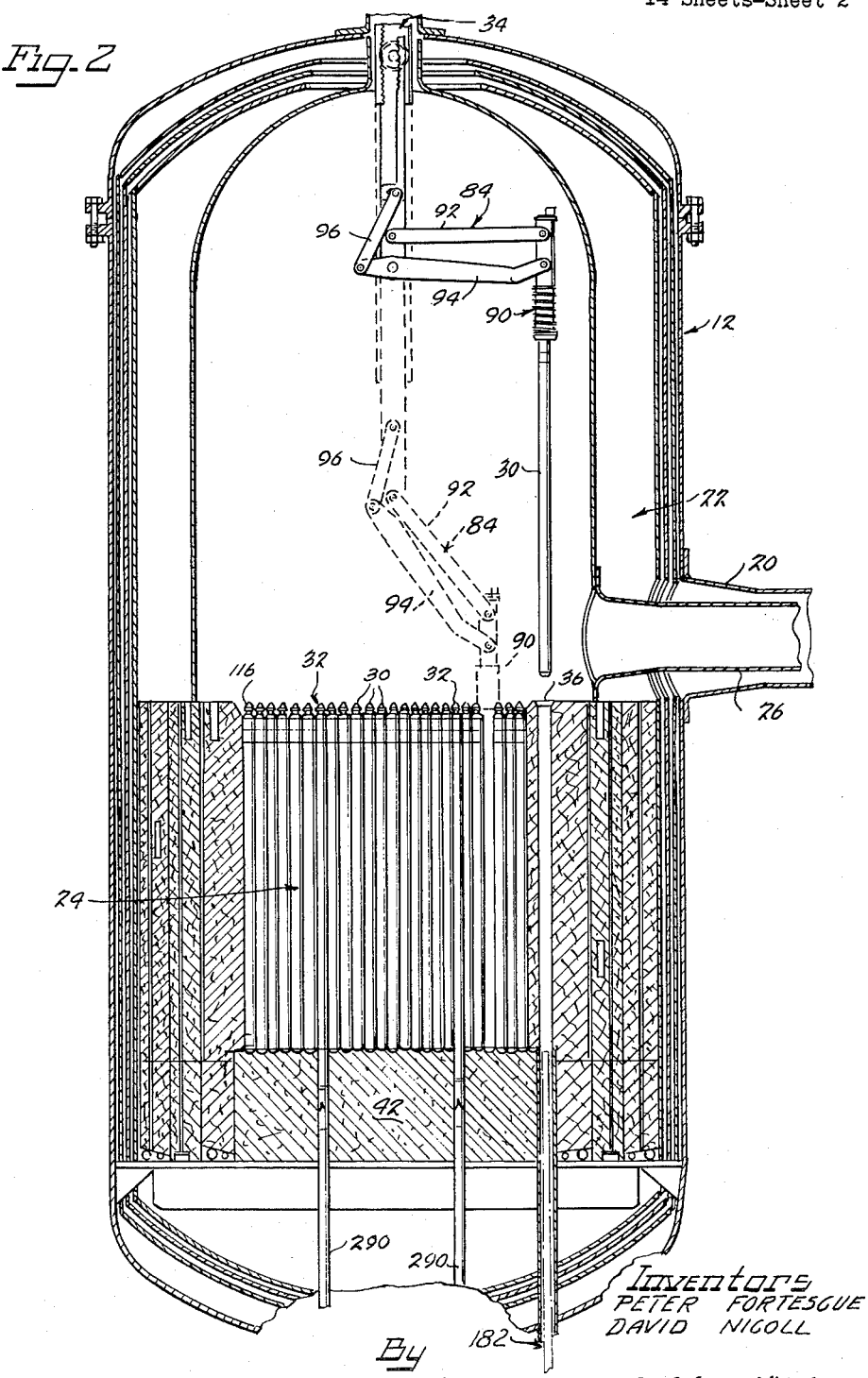

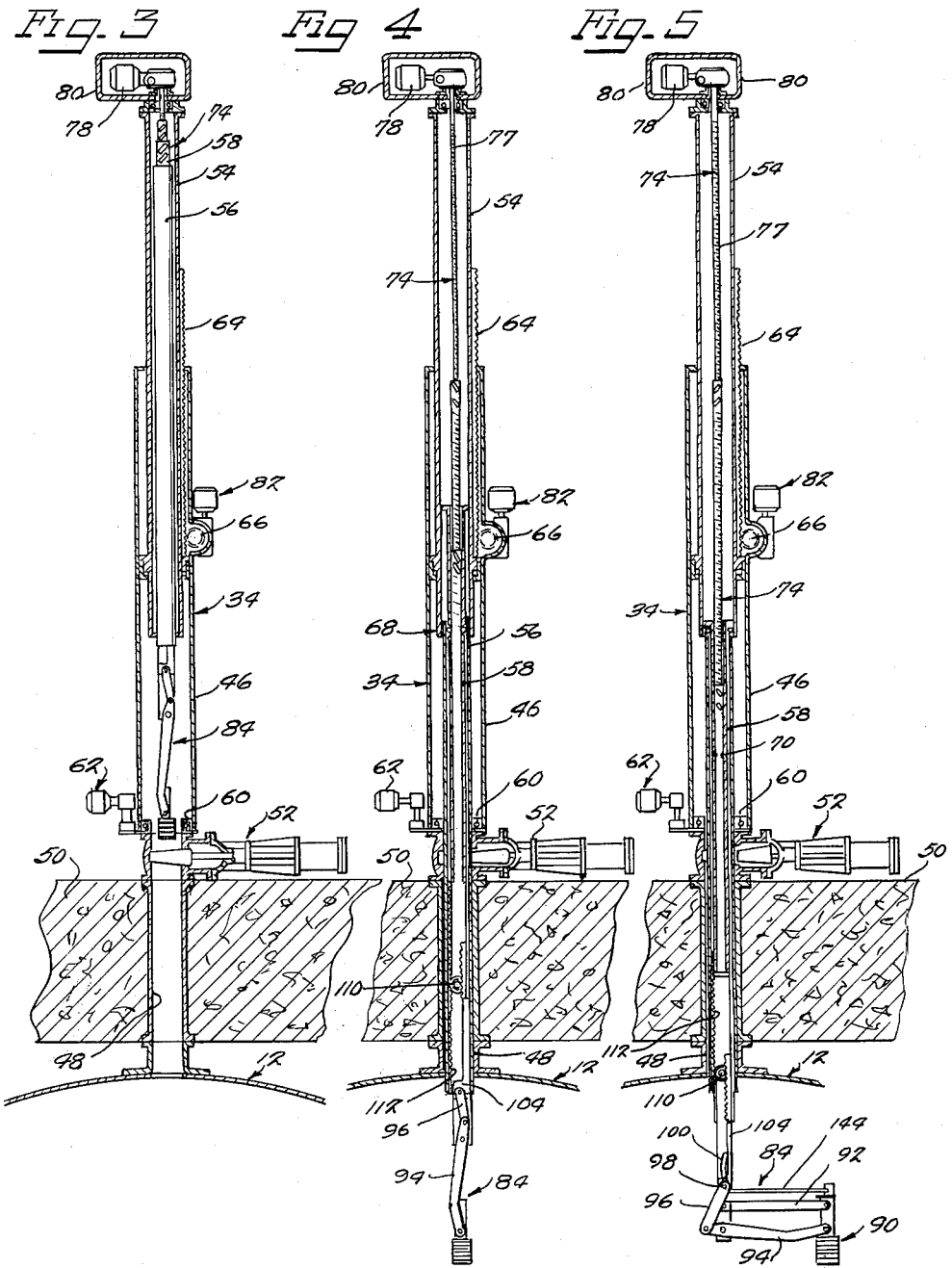

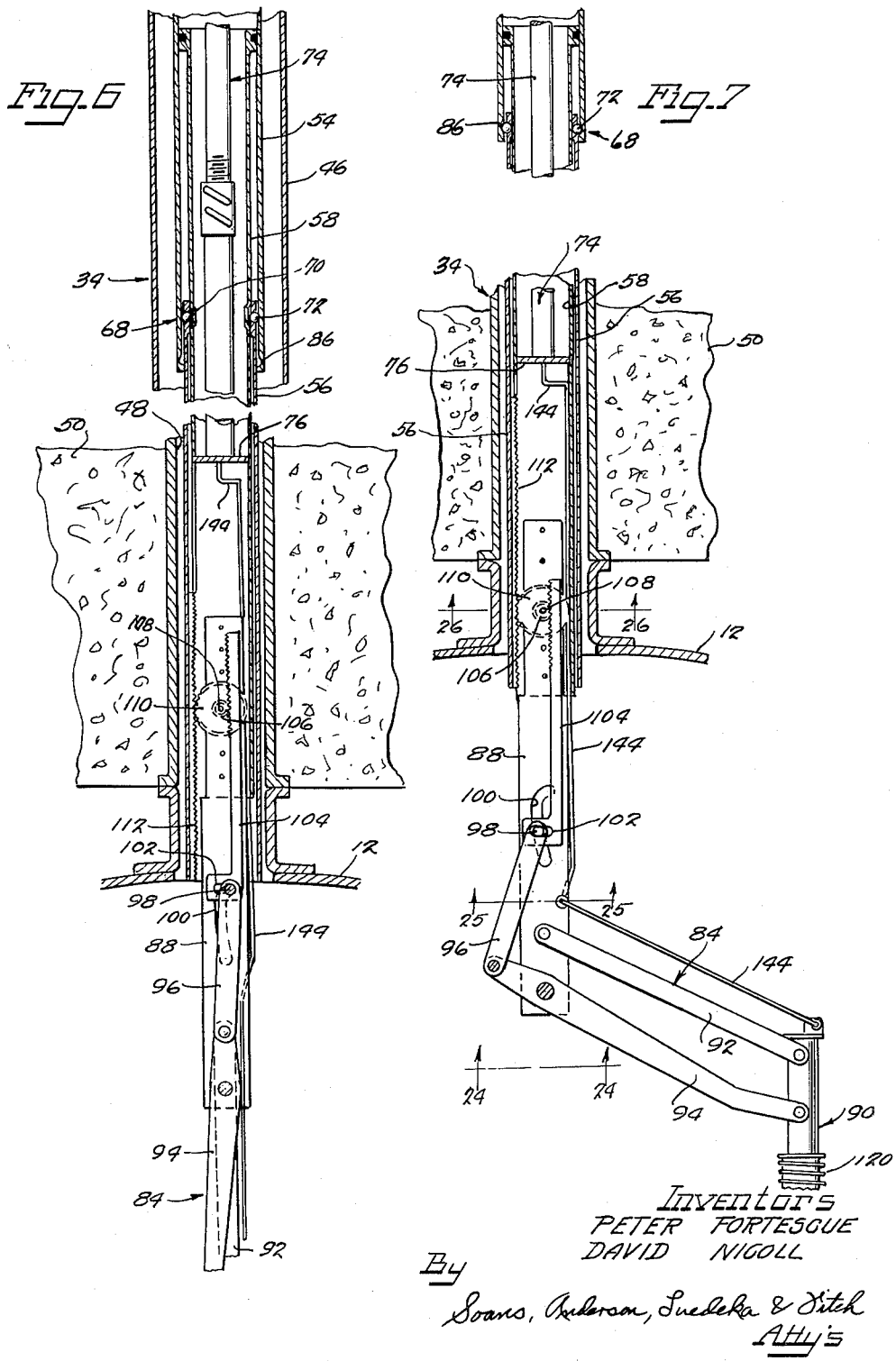

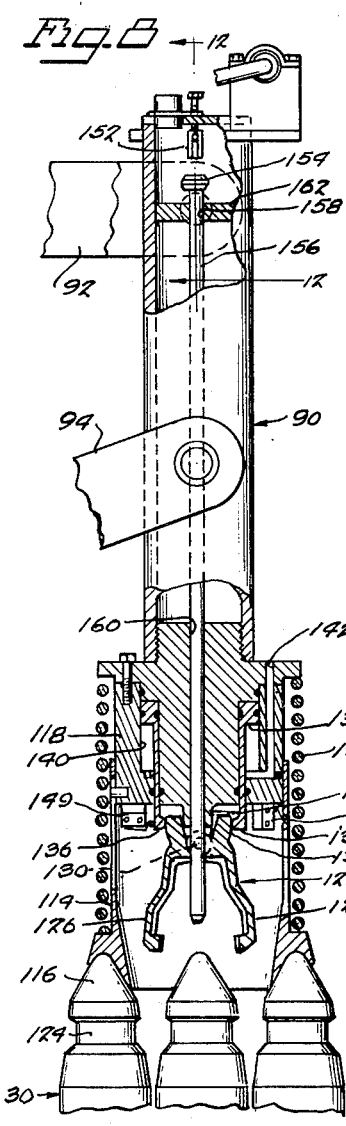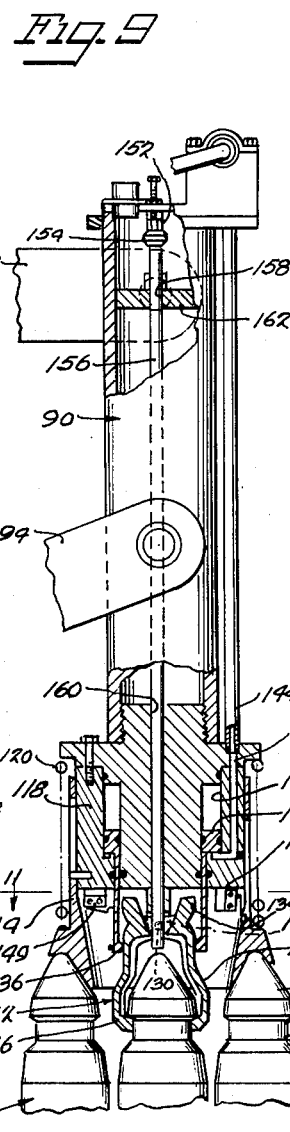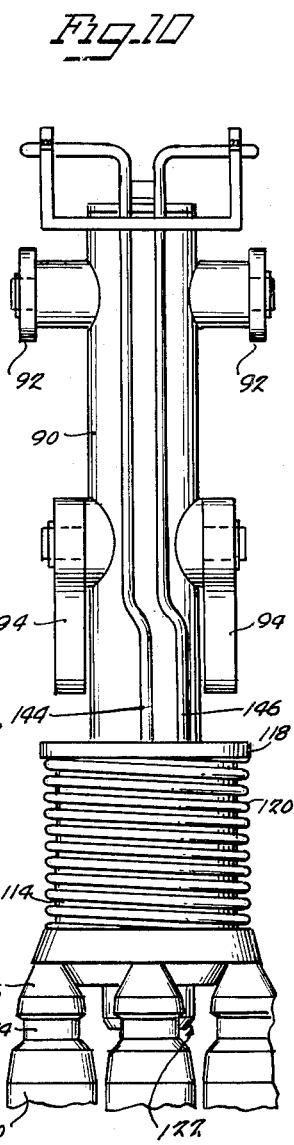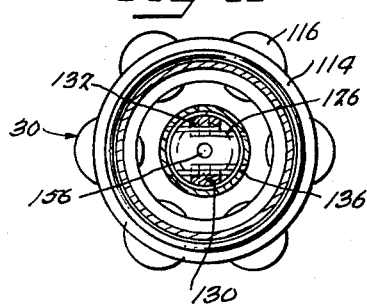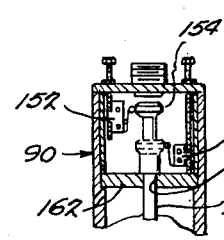

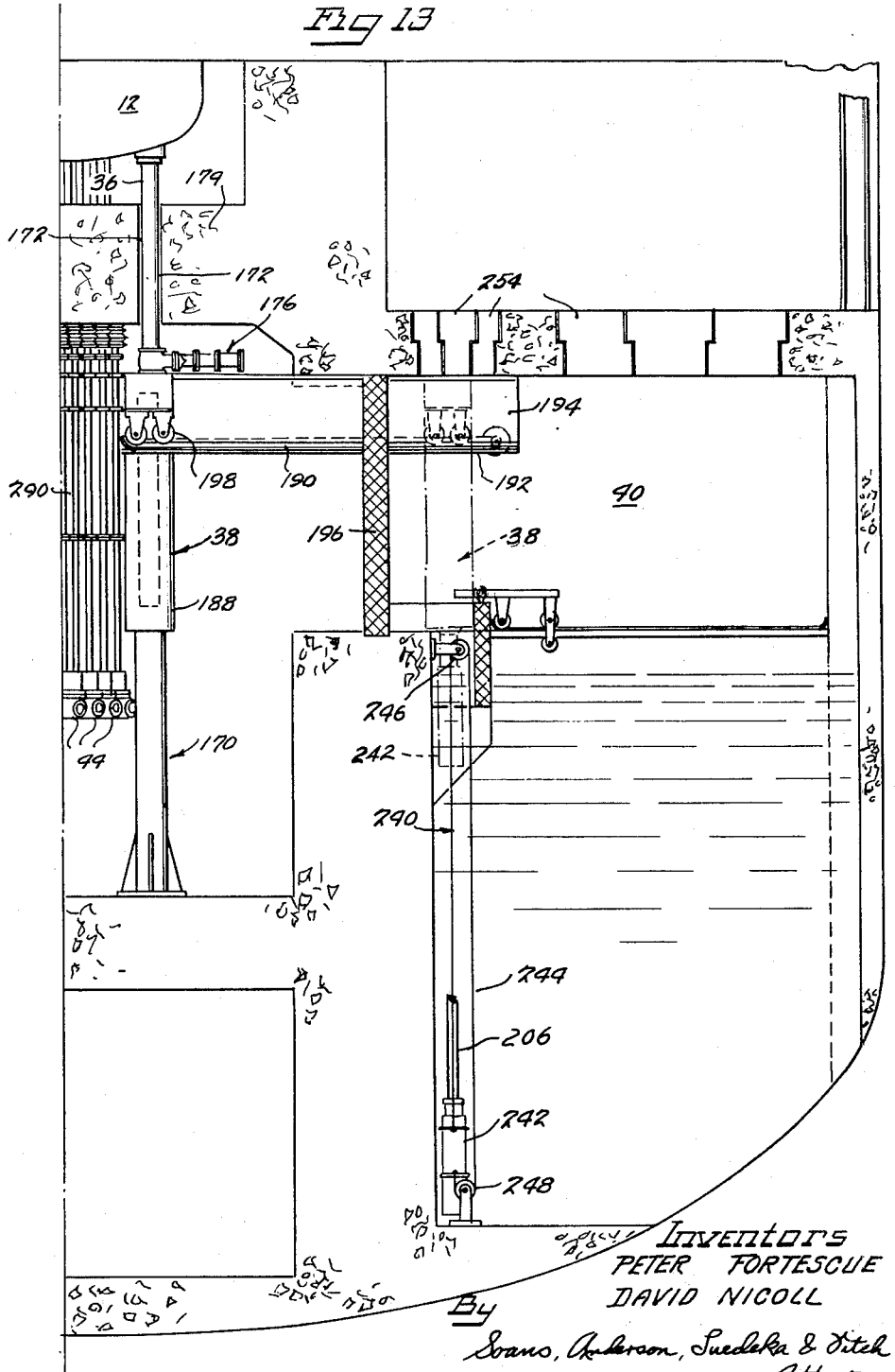

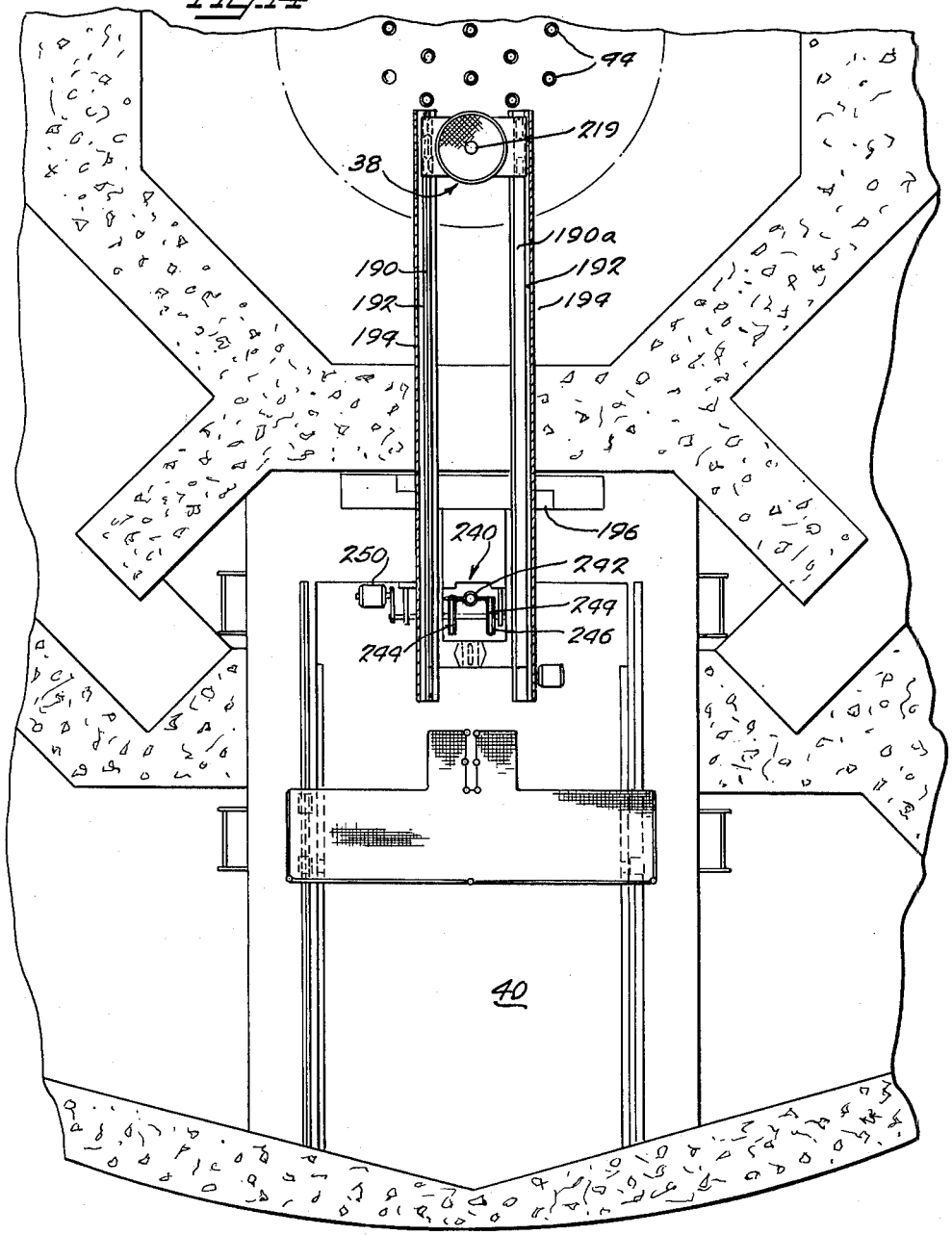

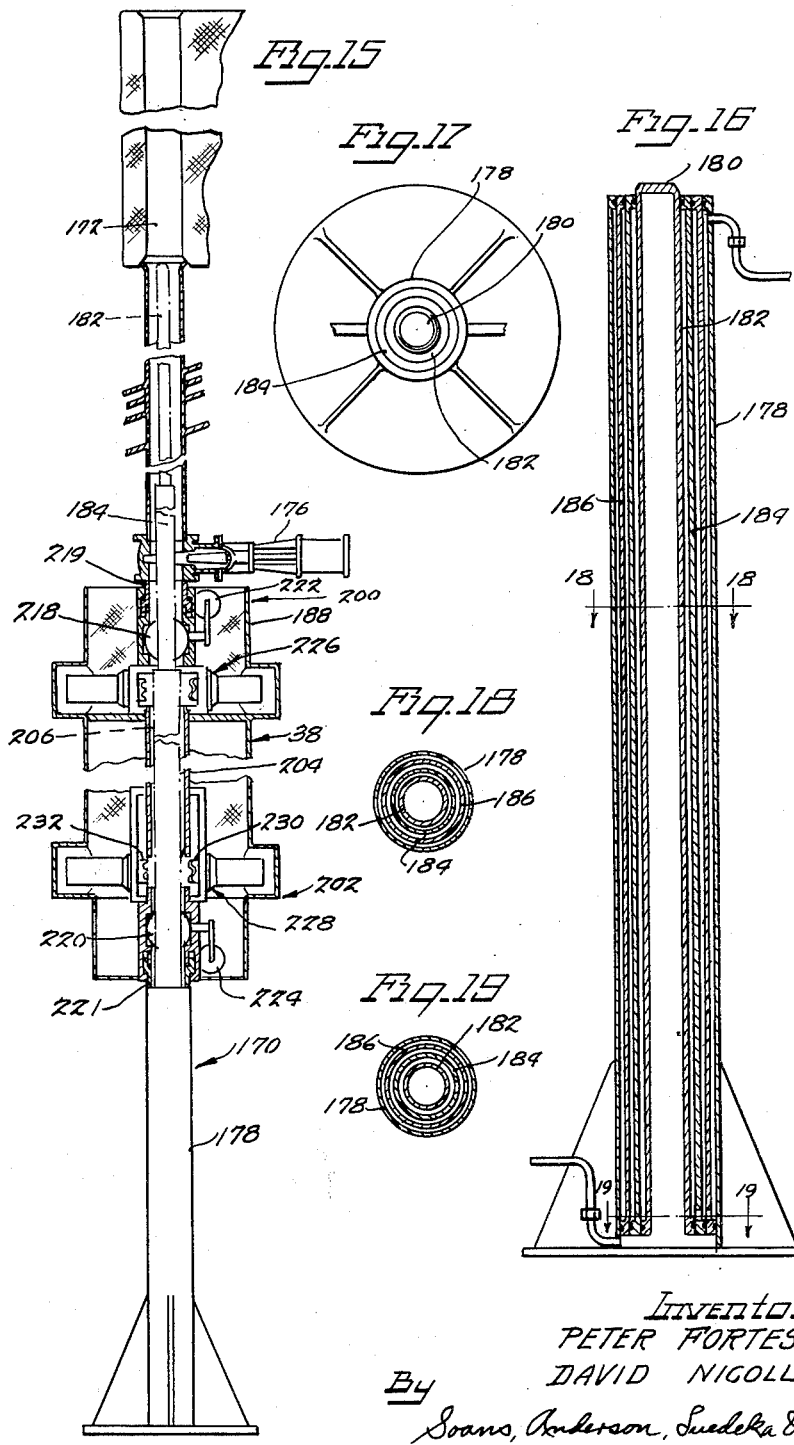

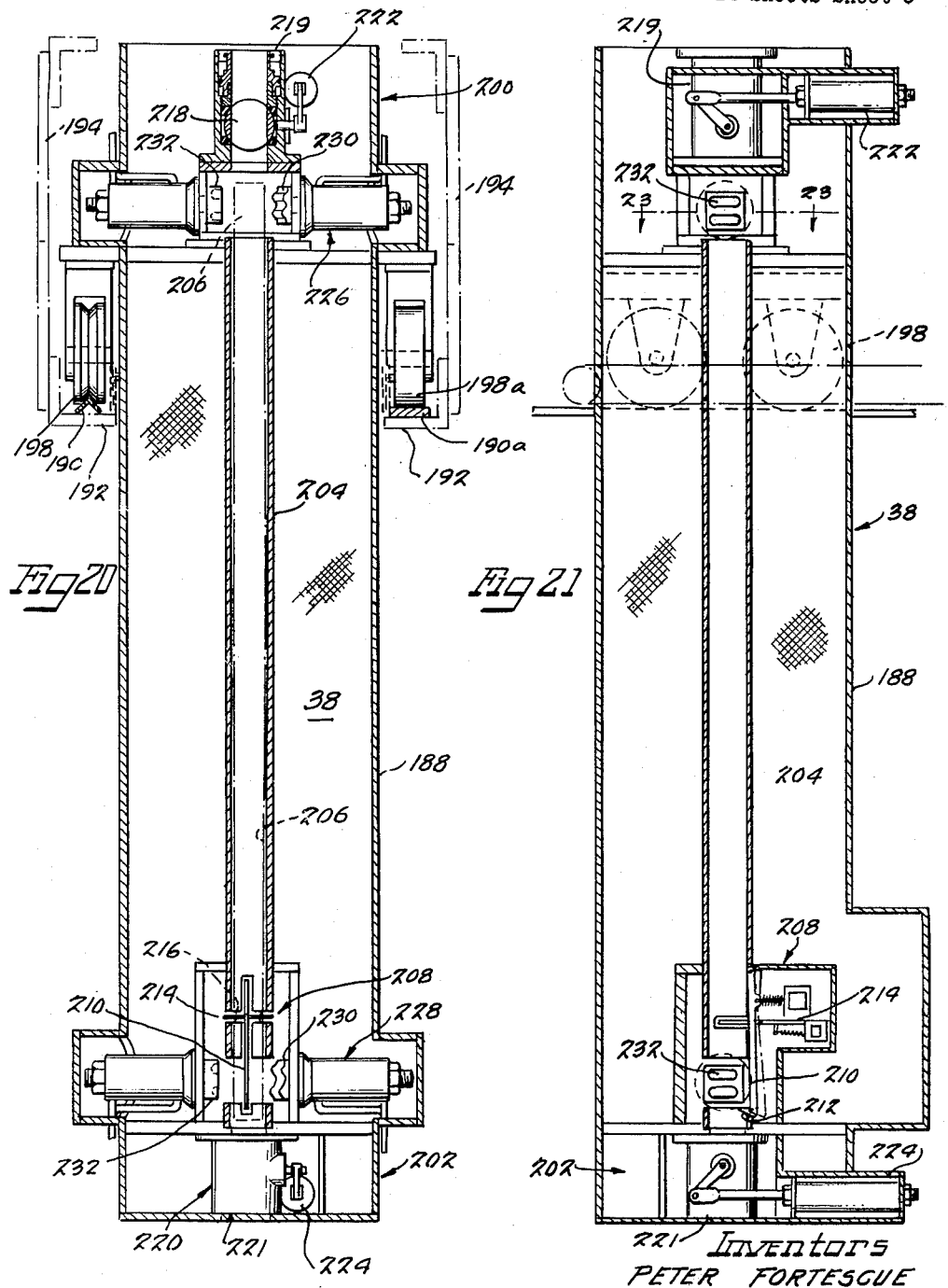

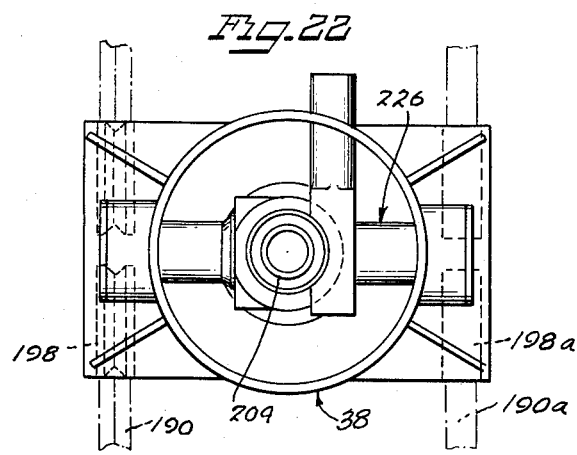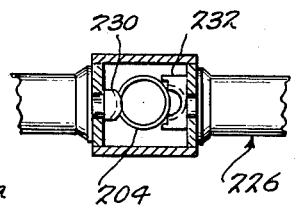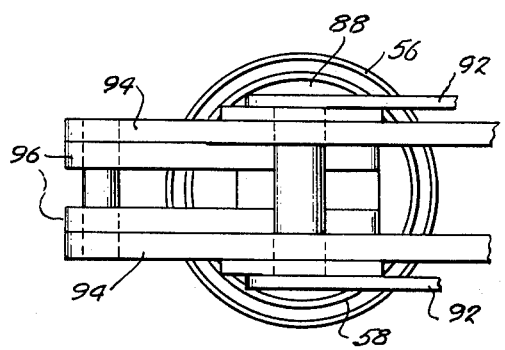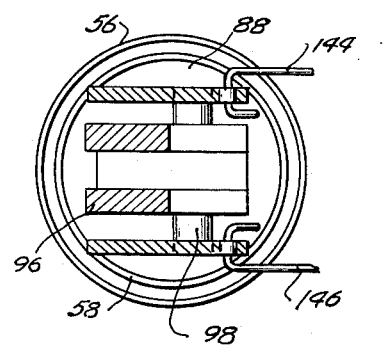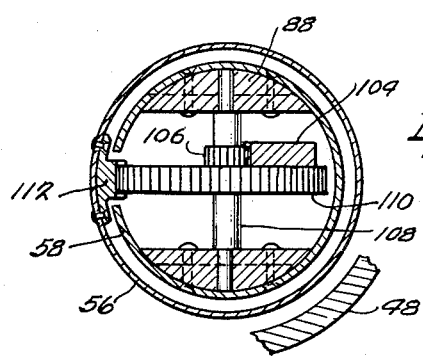

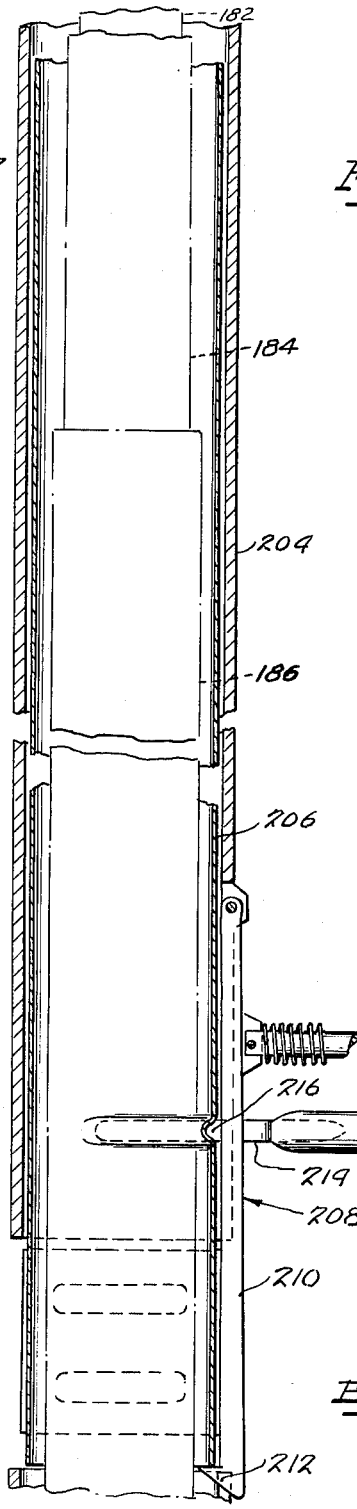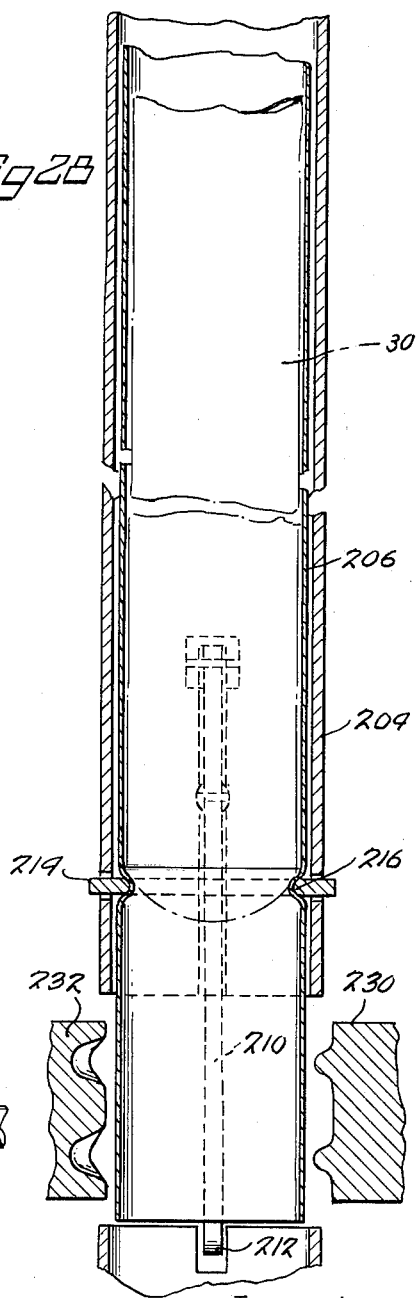

June 23, 1964 P. FORTESCUE ETAL 3,138,535
NUCLEAR REACTOR HAVING TRANSFER MECHANISM
Filed Nov. 21, 1958 14 Sheets-Sheet 12
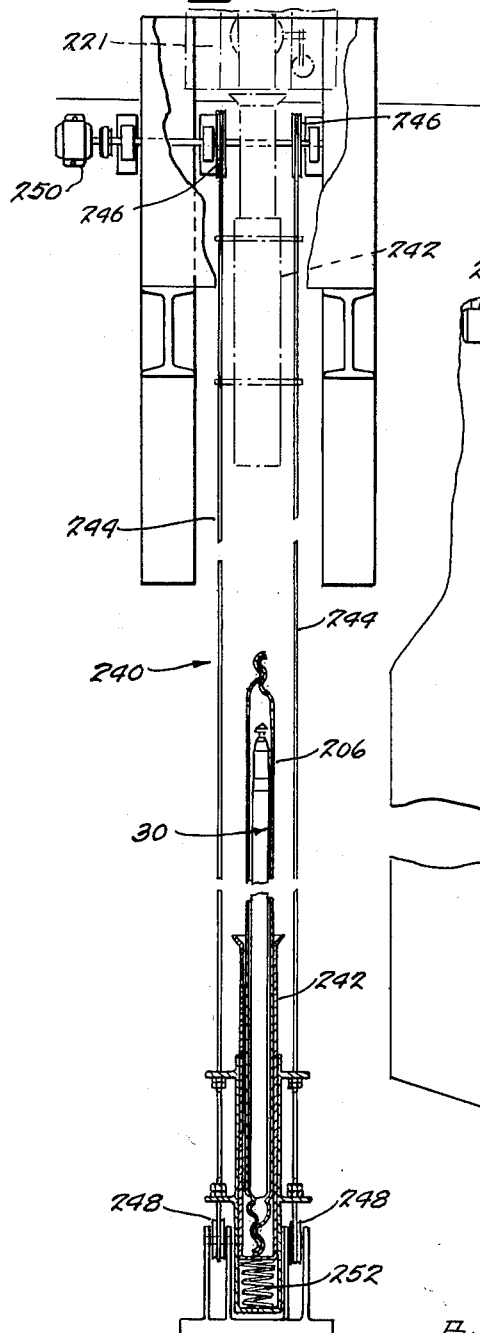
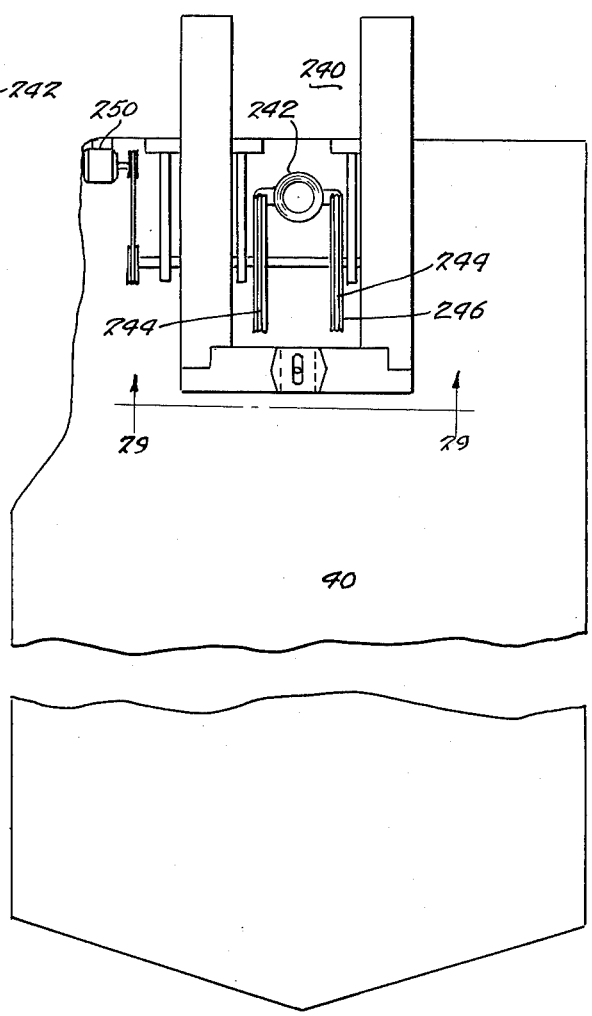
Inventors
PETER FORTESCUE
DAVID NICOLL
By Soans, Anderson, Luedeka & Fitch
Attys

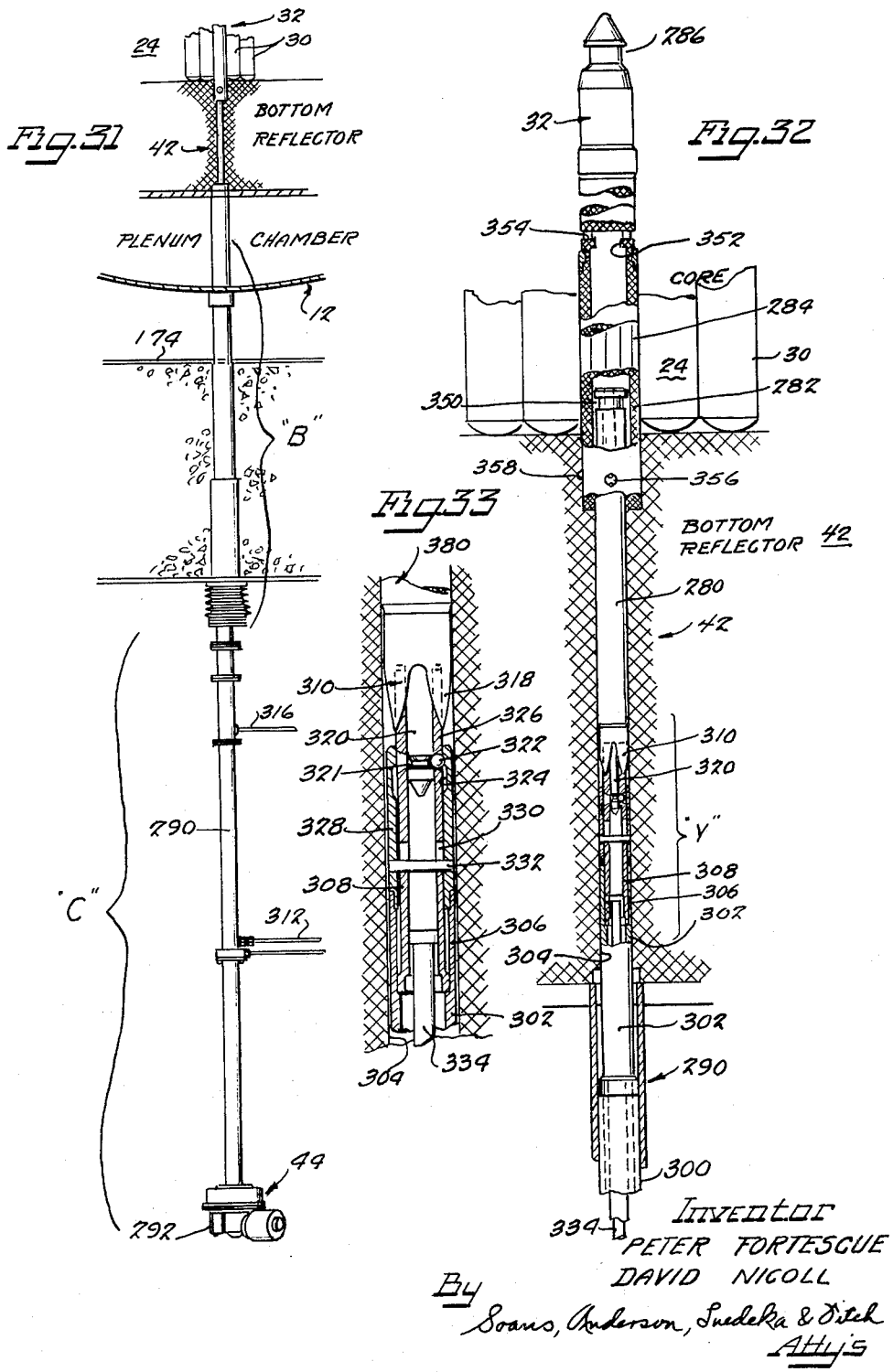

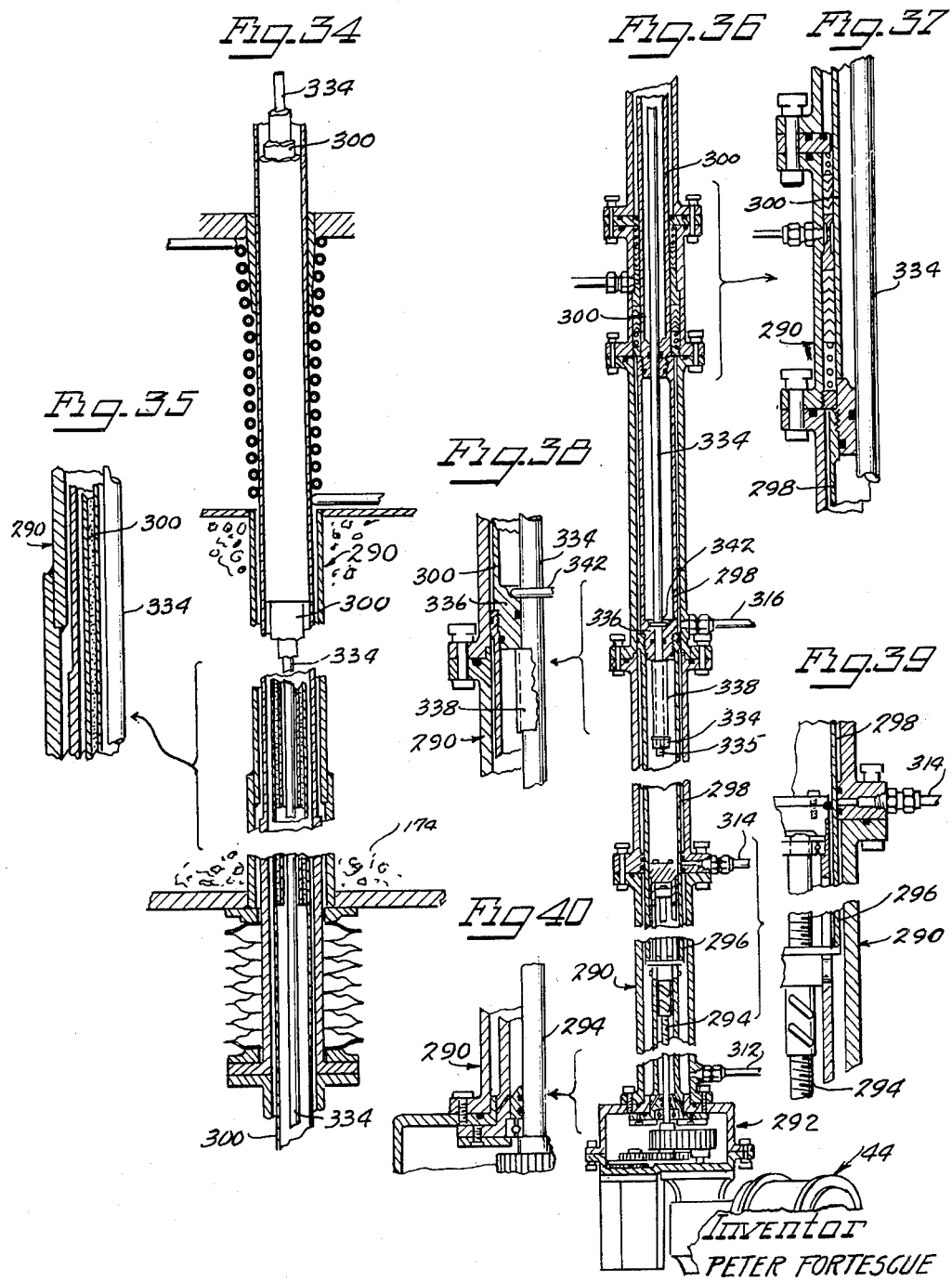

United States Patent Office 3,138,535
Patented June 23, 1964

3,138,535
NUCLEAR REACTOR HAVING TRANSFER MECHANISM
Peter Fortescue, La Jolla, and David Nicoll, Del Mar, Calif., assignors, by mesne assignments, to the United States of America as represented by the United States Atomic Energy Commission
Filed Nov. 21, 1958, Ser. No. 775,578
9 Claims. (Cl. 176—30)

The present invention relates generally to neutronic reactors and is more particularly directed to means for loading and unloading fuel elements in the reactor and for handling the replacement of the control rods.

It is desirable, if not necessary, in a neutronic reactor to provide means for loading and unloading the fuel elements, as well as the control rods, in a precise and efficient manner from a position outside of the main reactor vessel. Maximum safety precautions must be taken during the loading and unloading operations, in order to avoid leakage or radiation outside of the reactor. This problem can be particularly difficult in connection with a pressurized reactor vessel, such as is used in connection with gas-cooled power reactors.

It is the primary object of the present invention to provide novel means for loading and unloading fuel elements in a neutronic reactor. A further object of the invention is to provide improved fuel element handling mechanism, including a fuel element pick-up which is adapted to selectively raise or lower a chosen fuel element relative to its normal position within the reactor core and transfer the fuel element between such position and a remote position within the reactor vessel which affords passage of the fuel element outside of the vessel. Still another object of the invention is to provide improved means for transferring fuel elements and control rods from a position outside of the reactor to a position within the reactor affording engagement by a pick-up means. Another object of the invention is to provide novel mechanism for effectively transferring fuel elements relative to the reactor vessel, while effectively sealing the vessel against leakage. A further object of the invention is to provide spent fuel unloading mechanism, including means for sealing the spent fuel element within a container after it is removed from the reactor core and before it is placed in a storage facility. Still another object of the invention is to provide improved control rod mechanism which affords selective release of the control rod relative to its operating mechanism.

Other objects and advantages will be apparent from the following description of the selected embodiment illustrated in the accompanying drawings (14 sheets), wherein:

FIG. 2 is an enlarged cross-sectional view of the reactor vessel seen in FIG. 1;

FIGS. 3, 4 and 5 are enlarged cross-sectional views of a portion of the structure shown in FIGS. 1 and 2;

FIG. 6 is an enlarged fragmentary view of the mechanism seen in FIG. 4, with parts broken away and in section;

FIG. 7 is a sectional view of the structure shown in FIG. 6, with portions of the mechanism in a different operating position;

FIGS. 8 and 9 are enlarged elevational views, with portions broken away and in section, of the pick-up mechanism seen particularly in FIG. 5;

FIG. 10 is an elevational view of the structure in FIG. 9, taken from the right in FIG. 9;

FIG. 11 is a sectional view taken along the line 11—11 in FIG. 9;

FIG. 12 is a sectional view taken along the line 12—12 in FIG. 8;

FIG. 13 is an enlarged fragmentary view of the structure shown in FIG. 1;

FIG. 14 is a plan view of the structure shown in FIG. 13;

FIG. 15 is an enlarged fragmentary view of the structure in FIG. 13, with portions broken away and in section;

FIG. 16 is an enlarged sectional view of the tube at the lower end of the structure in FIG. 15;

FIG. 17 is a plan view of the structure in FIG. 16;

FIG. 18 is a sectional view taken along the line 18—18 in FIG. 16;

FIG. 19 is a sectional view taken along the line 19—19 in FIG. 16;

FIG. 20 is an enlarged elevational view of a portion of the structure shown in FIG. 15;

FIG. 21 is an end view of the structure in FIG. 20;

FIG. 22 is a plan view of the structure in FIG. 20;

FIG. 23 is a sectional view taken along the line 23—23 in FIG. 21;

FIG. 24 is an enlarged view taken along the line 24—24 in FIG. 7;

FIG. 25 is an enlarged sectional view along the line 25—25 in FIG. 7;

FIG. 26 is an enlarged sectional view taken along the line 26—26 in FIG. 7;

FIG. 27 is an enlarged fragmentary view of the structure in FIG. 21;

FIG. 28 is a side elevational view of the structure in FIG. 27;

FIG. 29 is an enlarged end view of a portion of the structure shown in FIG. 13, with parts broken away and in section;

FIG. 30 is a plan view of the structure in FIG. 29;

FIG. 31 is an enlarged view of one of the control rod drive mechanisms seen in FIGS. 1 and 13;

FIG. 32 is an enlarged view of a control rod and the uppermost section of its operating mechanism, partly broken away and in section;

FIG. 33 is an enlarged fragmentary view of the portion "Y" of the structure in FIG. 32;

FIG. 34 is an enlarged fragmentary view of an intermediate section of the control rod drive mechanism, indicated at "B" in FIG. 31, with parts broken away and in section;

FIG. 35 is an enlarged fragmentary view of the structure in FIG. 34;

FIG. 36 is an enlarged fragmentary view of the lower section of the control rod drive mechanism, indicated at "C" in FIG. 31, with parts broken away and in section; and FIGS. 37 through 40 are enlarged fragmentary views of the structure shown in FIG. 36, as indicated.

Figure 1:
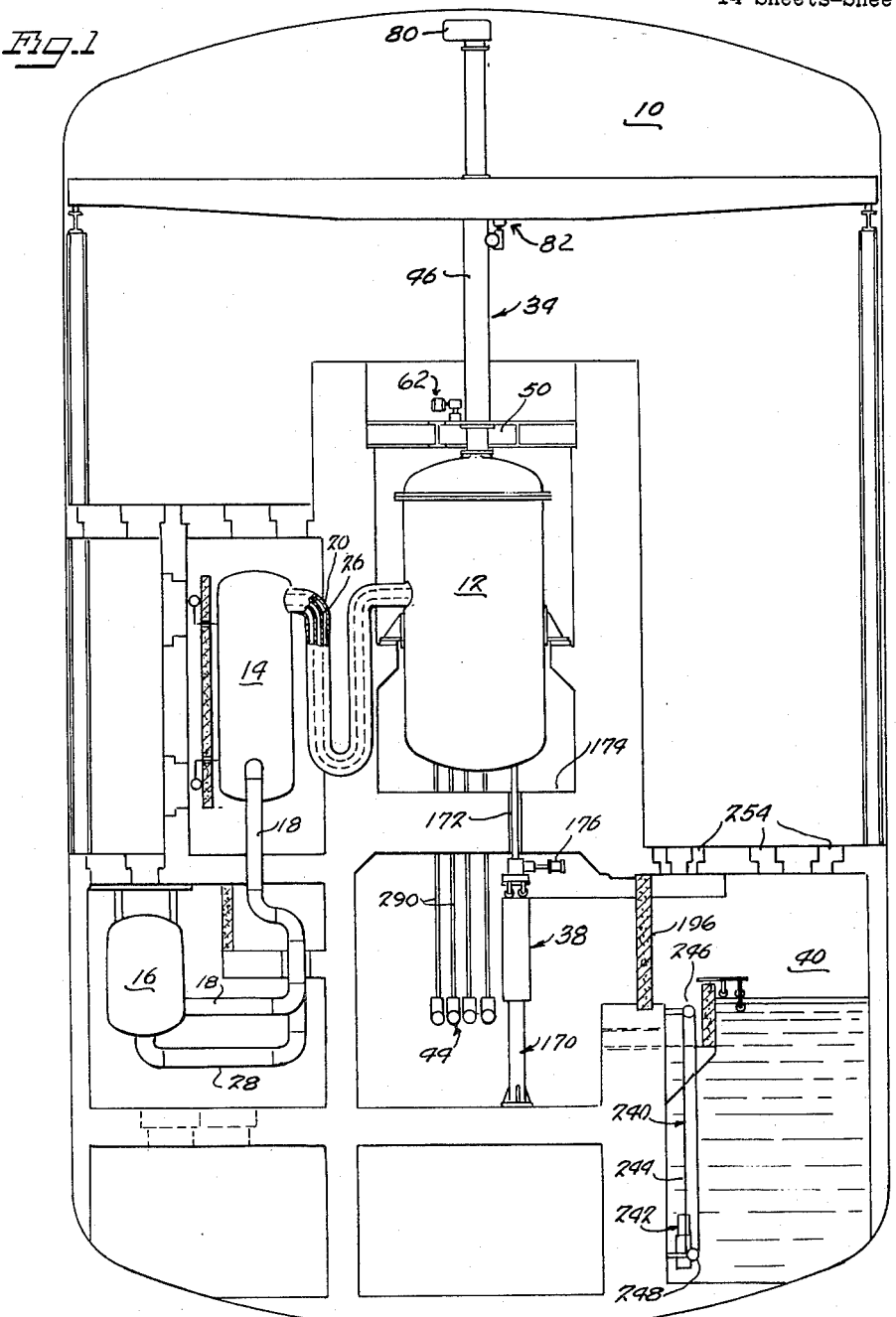
FIG. 1 is a schematic illustration of a gas-cooled neutronic reactor embodying the invention.

As seen particularly in FIG. 1 of the drawings, the invention is shown in connection with a gas-cooled neutronic reactor 10, wherein pressurized gas, such as helium, is used for carrying the heat produced within the reactor vessel 12. Such a system includes, in addition to the reactor vessel, one or more steam generators 14, and a source 16 of pressurized gas coolant which is in fluid communication with the steam generator 14 and the reactor vessel 12. The relatively cool gas is introduced into the reactor vessel to absorb heat therefrom and is then circulated back to the steam generator 14 where the heated gases are utilized in the production of steam. The pressure gas source or circulator 16 is in fluid communication with the steam generator 14 through a pipe 18 which affords the introduction of gas into the outer wall portion of the steam generator. This relatively cool gas passes through an outer chamber of the generator and is then transferred through the outer duct 20 of a pair of concentric ducts to the reactor vessel. The gas enters an outer chamber 22 of the reactor vessel 12 (FIG. 2) and is circulated through the vessel and into the central portion or core 24 thereof containing the fissionable material. From the core of the reactor vessel the pressurized gas, which has absorbed a considerable amount of heat due to neutronic activity within the reactor, is passed back to the steam generator through the inner duct 26 of the pair of concentric ducts. In the steam generator 14 (FIG. 1), the heated gases are passed through a water vessel or the like (not shown), in order to produce steam which may be utilized for power purposes. The heat dissipated gases are then fed back to the gas circulator mechanism through a return pipe 28. It is understood, therefore, that in the described system the reactor vessel 12 is under pressure from the coolant gas during its operation.

As noted in FIG. 2 of the drawings, the core or center portion 24 of the reactor vessel includes a plurality of elongated fuel elements 30 which are suitably and removably disposed in fixed relation to each other in a generally cylindrical area. Dispersed among the fuel elements are a plurality of control rods 32 of neutron absorbing material, which are provided for the regulation of a self-sustaining neutron chain reaction in the vessel. After a period of operation, the fuel elements become less reactive due to burn up of fissionable material and, therefore, must be replaced. Similarly, the control rod elements lose much of their neutron absorbing capacity after a time and must also be replaced. The control rods and the fuel elements are not necessarily used up in the same period and, consequently, in the ordinary course of operation, the rods and fuel elements are selectively replaced throughout the period of operation of the neutronic reactor.

For safety reasons, it is necessary that the replacement of the fuel elements and control rods be effected without undue exposure of personnel to radioactivity from the reactor. Furthermore, in connection with the spent fuel elements, it is necessary to provide suitable means for handling and storing the spent fuel until such time as the radioactivity of the elements has decayed to a safe level to permit the fuel elements to be processed for the recovery of fissionable material.

The present invention provides an effective and efficient system of means for handling the loading and unloading of fuel elements and control rods in a precise manner, and in a way such that escape of radiation from the neutronic reactor system is minimized.

Generally, the illustrated structure includes a fuel element pick-up and transfer mechanism 34, shown generally in FIG. 2, which is adapted to selectively engage one of the fuel elements or control rods, and to raise such element or rod relative to the reactor core 24 and deposit it in a discharge passage 36 (FIG. 2) adjacent to the periphery of the core. The spent fuel element or rod passes downwardly through the reactor vessel to a transfer coffin 38 (FIG. 1) where it is sealed in a canister and then removed to a storage vessel 40. After the spent fuel element has been stored under water for a sufficient length of time to dissipate its radioactivity, it may be removed from the storage vessel for processing.

As indicated above, the fuel elements 30 and control rods 32 are disposed in a generally cylindrical core 24 at the center of the reactor vessel 12. The lower end of the fuel elements rests on a horizontal base 42 (FIG. 2) of reflecting material, and the control rods are suitably detachably connected to a drive mechanism 44 (FIG. 1) in supported relation thereto. The upper end of each of the fuel elements and control rods is generally conical with a reduced neck portion being provided in order to afford engagement by the grappling or pick-up means 34, as seen generally in FIG. 2.

The pick-up means 34 which is used for effecting replacement of the fuel elements and control rods within the core, is shown particularly in FIGS. 2–12, and includes a tubular housing 46 which projects upwardly from the center of the reactor vessel 12. This tubular housing 46 is in communication with the reactor vessel through a passageway 48 (FIG. 3) extending through a biological shield 50 at the upper end of the vessel. At the lower end of the housing 46 for the pick-up mechanism, there is provided a suitable isolation valve 52 for selectively sealing off the reactor vessel from the pick-up housing. The housing 46 receives three telescoping cylinders 54, 56 and 58 (FIGS. 4 and 6) which are movable axially of the housing and with respect to one another. The tubular housing 46 for the pick-up means is fixed in position on the reactor by means including a bearing 60 which affords rotation of the housing about its axis. A rotary indexing motor and gear reduction unit 62 is suitably connected with this housing, as by a gear and circular rack (not shown) to provide for selective rotation of the housing.

The three telescoping cylinders which are movable through the housing 46 to position the grappler mechanism 34 within the reactor vessel, comprise an upper cylinder or member 54, an intermediate cylinder 56, and a lower cylinder 58. The upper cylindrical member 54 is selectively, axially movable relative to the housing 46, through means of a rack 64 (FIGS. 3–5) on the outside of the former and a motor driven gear 66 carried by the pick-up housing. The intermediate or middle cylinder 56 is slidably disposed within the upper cylinder 54, and the two are adapted to be locked together by a ball locking mechanism 68 (FIG. 7). The lower or innermost cylinder 58, is slidable within the middle cylinder 56 and includes an annular groove 70 at an intermediate position therealong which also cooperates with balls 72 forming part of the aforementioned ball locking device. Thus it is seen that, as the lower cylinder 58 is moved upwardly relative to the intermediate cylinder 56, the balls 72 of the locking mechanism can move into the groove 70 on the surface of the lower, inner cylinder and thereby lock the middle and lower cylinders together and, at the same time, release these two cylinders for movement as a unit relative to the upper cylinder 54, as seen in FIG. 6.

Movement of the lowermost cylinder 58, and the associated middle cylinder 56 when the two are locked together, is effected by a telescoping ball screw 74 which is disposed centrally of the telescoping cylinders and secured at its lower end to a transverse plate 76 (FIG. 6) within the lower cylinder. As illustrated in FIGS. 4 and 5, the ball screw is in three sections and the uppermost section 77 is drivenly connected with a motor and gear reduction unit 78 carried in a housing 80 supported on the upper end of the upper telescoping cylinder. As seen in FIG. 3, when the pick-up mechanism is fully retracted from the reactor vessel, the upper cylinder 54 is disposed in its uppermost position, with the lower end of the rack 64 engaged by the gear 66 driven by the insertion motor unit 82, and the intermediate and lower cylinders 56 and 58 are telescoped within the upper cylinder 54 by operation of the ball screw motor 78. In this position, the grappler mechanism at the lower end of the lower cylinder, indicated at 84 in FIG. 3, is completely withdrawn from the reactor vessel 12 and the entrance passage 48, and the isolation valve 52 is moved into position to seal the reactor vessel from the pick-up housing 46.

When it is desired to position the grappler mechanism 84 within the reactor vessel 12 to insert or withdraw a fuel element or control rod, the isolation valve 52 is opened and the ball screw motor 78 is actuated to move the telescoping ball screw 74 downwardly in the housing and into the passage 48 in the upper biological shield 50. The downward extension of the ball screw carries with it the lower and intermediate cylinder 56 and 58, which are locked together in the position shown in FIG. 6 by the ball locking means including the recess 70 and balls 72. As the locking device reaches the annular inner groove 86 at the lower end of the upper cylinder 54, the balls 72 move outwardly into groove 86 and thus permit the lower cylinder 58 to continue moving downwardly, while the intermediate cylinder 56 remains locked against axial movement relative to the upper cylinder 54. At the lowermost end of the ball screw travel, the pick-up telescoping cylinders are disposed as seen in FIG. 5. The described downward movement of the lower cylinder 58 relative to the intermediate cylinder 56 is effective to position the grappler mechanism 84 radially of the reactor vessel.

The mode of operation of the pick-up mechanism will now be described, with reference particularly to FIGS. 6–10 which most clearly illustrate this mechanism. The pick-up mechanism includes a tubular member 88 fixed to the lower end of the lower telescoping cylinder 58, which is supportingly connected with the grappler head 90 (FIG. 7) through a gear operated linkage means. More particularly, the lower section of the tubular member 88 has two pairs of generally parallel links 92 and 94 pivotally mounted thereon, which pivotally support the grappler head 90 at their free ends in a manner affording vertical movement of the latter. The lower pair of links 94 are also connected by a pair of operating links 96 with an upper portion of the pick-up by means of a pivot pin 98 which extends transversely of a slotted cam-way 100 in the tubular member 88. The pivot pin 98 also extends through a slot 102 in the lower end of a vertically extending rack member 104 which includes teeth in meshing engagement with a gear 106 fixed to a transverse shaft 108 carried by the lower cylindrical member 58. Also affixed to this shaft 108 is a larger gear 110 which projects through an opening in the lower cylindrical member 58 for meshing engagement with a rack 112 fixed along the inside of the intermediate cylindrical member 56. Since the intermediate cylinder 56 is stationary during the adjusting stroke of the lower cylinder 58, due to locking device 68, the motion imparted to the latter by continued extension of the ball screw 74 causes the gear 110 to rotate over the stationary rack 112, and this rotation is imparted through the smaller gear 106 to the movable rack 104. Movement of the latter causes the pin 98 to move in the cam-way 100 and thereby impart movement to the operating links 96 and the parallel links 94 connected therewith. The parallel linkage, of course, provides for moving the grappler head constantly parallel to the reactor vertical center line.

The grappler head 90 is moved to a constant predetermined height in the reactor vessel 12 each time the lower cylinder 58 reaches the position where it is released by the ball locking mechanism for movement relative to the intermediate cylinder 56. Of course, since the fuel elements are disposed in radially spaced relation within the core 24, and the discharge passage 36 is at the outer periphery of the core, the grappler head must be moved through different distances radially of the reactor core to position it for engagement with an element. This is accomplished by translating the vertical movement of the lower cylinder 58 into radial movement of the grappler head 90 through the parallel linkage 94 and the operating mechanism therefor.

The operating means for the grappler head 90 is constructed and arranged so that the vertical distance of the grappler head relative to the lower end of the cylinder 58 is always equal to the amount of vertical travel imparted through the ball screw 74 to the lower cylinder 58 during its grappler positioning stroke, which occurs after the cylinder 58 is released for movement relative to the intermediate cylinder 56. Thus, the grappler head 90 moves parallel to the upper surface of the reactor core during the movement of the lower cylinder 58 relative to the intermediate cylinder 56.

Adjustment or positioning of the grappler head 90 circumferentially of the axis of the reactor core 24 is provided for by the rotary movement afforded for the pick-up housing 46 through the motor driven gear reduction unit 62 which drivingly engages a circular rack on the housing. Rotation of the housing 46 causes the entire pick-up mechanism, including the grappler head 90, to rotate to the desired position. Such movement, coupled with the described radial movement of the grappler head through operation of the ball screw drive motor, enables selective positioning of the grappler over an element or control rod in the vessel 12. The entire pick-up mechanism may then be lowered so that the grappler head 90 engages the head of the selected element, by operation of the insertion motor unit 82. The latter drives the gear 66 engaging the rack 64 on the upper cylinder 54 to thereby move the cylinder and the remainder of the pick-up associated therewith downwardly in the vessel 12, so as to effect the desired engagement of the grappler head 90 with the element. Withdrawal of the element is effected by reversing the drive of the insertion motor 82 for the pick-up. In so doing, the withdrawn element is elevated to a predetermined uniform height and the element is then moved radially to the discharge passage 36, through movement of the lower cylinder 58 by extension of the telescopic ball screw 74 through the operation of the ball screw drive motor unit 78.

After the grappler head 90 is lowered over the element to be moved, it is actuated by remotely controlled mechanism to engage the head of the element. As seen particularly in FIGS. 8 and 9, the grappler head 90 comprises a generally annular outer portion 114 which has its lower edge provided with a recess which is shaped to engage the conical head portions 116 of the fuel elements or rods disposed immediately adjacent to the one to be removed, to thereby center the grappler with respect to the fuel element or rod to be removed. This annular portion 114 of the grappler head is slidable relative to a main cylindrical body 118 of the grappler head, and a coil spring 120 is disposed around the main body and the annular portion 114 in position to afford movement of the latter relative to the upper main body and thereby avoid placing any shock loads on the engaged fuel elements. The inner portion of the grappler includes a tong-like structure 122 at the lower end, which is shaped to supportingly engage the fuel element at the reduced neck portion 124 thereof, as seen in FIG. 9. The tongs 122 includes two sections 126 and 128 which are pivotally connected adjacent their upper ends by means of a pin 130 which is fastened to a pair of depending lugs 132 on the body 118. The upper ends 134 of the tongs are each formed to provide a cam surface which is engageable by a sliding element 136 on the main body 118 in a manner affording movement of the tong sections 126 and 128 toward and away from each other. This slidable element 136 is generally cylindrical and includes an enlarged flange portion or piston 138 at its upper end which is slidable within an annular housing 140 located inwardly of the grappler body. The housing 140 is in fluid communication through a pair of passageways 142, only one of which is shown, and through a pair of conduits 144 and 146 with a source of pressure fluid not shown. In the illustrated embodiment, the conduits 144 and 146 extend upwardly through the end of the lower cylinder 58 (FIG. 7) and thence through the hollow interior of the telescoping ball screws 74 to an independent source of fluid pressure, such as helium, outside the reactor vessel. Each of the passages 142 communicate with opposite sides of piston 138 to provide positive action of the piston in both directions of movement. Thus, movement of the pressure fluid relative to the chamber 140 in the grappler head 90 affords vertical movement of the cylindrical sliding element 136 to thereby engage the cams 134 and move the tong sections 126 and 128 toward and away from each other.

In order to afford remote operation of the pick-up, suitable indicating and control means are provided, including a micro switch 148 disposed at the lower end of the grappler body 118 (FIGS. 8 and 9) in position to indicate contact of the annular member 114 with the elements surrounding the one to be removed. A second micro switch 149 is mounted on the lower end of the grappler body 118 for indicating the position of the tong mechanism 122. A contact, on the slidable element 136 operates switch 149 to provide a remote signal when the tong operating element 136 is in the uppermost position (FIG. 8), indicating that the tongs are fully open.

Additional means for indicating the position and condition of the grappler head 90 is provided by another pair of micro switches 150 and 152 (FIG. 12) which are disposed at the upper end of the grappler head. These switches are arranged in vertically spaced relation and in position for actuation by a contact 154 on the upper end of a rod 156 located centrally of the grappler head. The rod 156 is slidably disposed within aligned bores 158 and 160 located in a plate 162 at the upper end of the grappler head and through the main body portion 118, respectively. Rod 156 extends downwardly between the tongs 126 and 128 and, prior to contact with a fuel element or control rod head, is in the lowermost position seen in FIG. 8 and indicated in dotted lines in FIG. 12. In this position, the switch 150 is closed to thereby indicate on a control panel the initial position of rod 156. After the grappler head 90 is lowered into engagement of the annular member 114 with the adjacent fuel elements the lower end of rod 156 moves downwardly until it strikes the element to be removed. The rod is then pushed upwardly relative to the grappler body 118 as the grappler head seats itself in the position shown in FIG. 9. The contact 154 at the upper end of rod 156 is thereby moved into engagement with the uppermost micro switch 152 to close the latter and indicate to the operator that the grappler is in centered relation with respect to the fuel element and ready for operation of the fluid piston 138 to close tongs 122.

Preferably, the described indicating means is also arranged in controlling relation to the operating motors for the pick-up mechanism to provide added safety in the handling of the fuel elements. For example, a suitable arrangement (not shown) should be provided whereby the motor 82 (FIG. 5) cannot be operated for retraction of the grappler mechanism until switches 148 and 152 are closed and switch 149 is opened to indicate engagement of the fuel element that is to be raised. Similarly, other means could be provided to indicate to the operator at all times the condition and location of the grappler within the vessel and to prevent erroneous operation of the pick-up means.

After the element has been raised out of the core of the reactor, it is moved laterally to the discharge passage 36 which is located at one side of the core, as seen in FIG. 2 of the drawings. The removed element is lowered into this passage to a position of support by a fuel raising and lowering mechanism 170 (FIG. 1) located below the reactor vessel. The discharge passage 36 includes a section 172 at the bottom of the vessel which passes through a shield below the latter, and the section 172 is selectively sealed at its lower end by means of an isolation valve 176 (FIG. 13).

With reference first to FIG. 15, it is seen that the fuel raising and lowering mechanism 170 includes a generally cylindrical housing 178, including therein a telescopic piston which is in three sections 182, 184 and 186, respectively, and of sufficient length to move upwardly through tube 172 and into the lower end of the discharge passage 36 in the reactor vessel. The upper end 180 of the upper piston section 182 (FIG. 16) is generally flat, or otherwise suitably shaped, so as to supportingly engage the lower end of a fuel element or control rod disposed in the discharge passage. Intermediate the discharge tube or passage 172, which extends downwardly from the reactor vessel, and the upper end of the housing 178 for the telescopic piston there is afforded space for entry of the transfer coffin 38 in vertically aligned relation to the discharge passage 172 and the telescopic piston 182. Generally, this transfer coffin includes a vertically disposed tubular portion 188 through which the telescopic piston is movable so that the upper end 180 of the piston section 182 may be moved upwardly into engagement with the fuel element in the discharge passage 36 and then retracted so as to place the fuel element within the transfer coffin.

As noted in FIGS. 13 and 14, the transfer coffin 38 is mounted for lateral movement relative to the fuel raising and lowering means 170, through the use of a pair of rails 190 and 190a which are supported on angle irons 192 (FIG. 20) fixed to a pair of generally parallel plate members 194 suitable supported within the reactor enclosure. The plate members 194 and the rails 190 and 190a extend from a position adjacent the lower end of the discharge passage 172 through a removable wall section 196 (FIGS. 13 and 14) and into the fuel storage compartment 40. As noted particularly in FIG. 20, the transfer coffin 38 includes a pair of rollers 198 and 198a, respectively, on opposite sides thereof with at least one of the rollers (198) being flanged to guidedly engage the underlying rail.

As seen in FIGS. 20 and 21, the transfer coffin comprises the generally cylindrical housing portion 188, which is of somewhat greater length than the fuel element to be received therein. Axially of the outer housing 188 and fixedly arranged between a pair of frame structures 200 and 202, which are disposed respectively at the upper and lower end of the coffin, is an elongated tubular member 204 which is adapted to receive an elongated cylindrical canister, shown in dotted lines at 206 in FIG. 20, for housing the spent fuel element. At the lower end of the tubular member 204 is a remotely controlled solenoid operated canister locating and clamping mechanism 208 which is adapted to index the canister with respect to the tube 204 and hold it in a predetermined position. This locating and clamping mechanism includes a pivotally mounted finger 210 (FIG. 21) including a ledge 212 at its lower end, and finger 210 is mounted on the side of the tube 204 in position to move the ledge 212 into and out of the path of the canister. Also disposed at the lower end of the tube 204 is a transversely disposed generally yoke like element 214 which is adapted for movement into a position of engagement with an annular groove 216 formed in the lower end of the canister 206. When a canister is lowered into the tube 204 from the upper end thereof, the ledge 212 of the positioning finger 210 is initially disposed within the tube to catch the lower end of the canister and index it vertically with respect to the tube. At such time, the transversely movable yoke 214 is caused to move into engagement with the annular groove 216 of the canister by a controlling solenoid within the mechanism 208 and thereby clamps the canister in position. The finger 210 is then moved out of the tube to the position indicated in broken lines in FIG. 21 by a controlling solenoid within the mechanism 208.

Adjacent the upper and lower ends of the transfer coffin 38 are a pair of ball valves 218 and 220, respectively, which are adapted and arranged to selectively seal off the upper and lower end of the passage through the transfer coffin. Each of these valves 218 and 220 is suitably connected with a pressure fluid cylinder 222 and 224, respectively, for actuation by the latter. When these valves are open, there is a free passage through the center of the transfer coffin 38 from its upper to its lower end. As indicated previously, the upper end of this passage is adapted to coincide with the lower end of the discharge passage section 172 to provide a continuation thereof, and the lower end of the passage through tube 204 is adapted to mate with the housing 178 for the telescopic raising and lowering piston. Suitable remotely controlled pneumatically operated seals 219 and 221 (FIG. 20) are provided at the ends of the passage through the transfer coffin for making contact seals with the lower end of the flange of the isolation valve 176 and the upper flange surface of the telescopic tube housing 178, respectively, thereby forming a sealed passage for the transfer of the fuel elements.

When a canister is disposed within the central tube 204 of the transfer coffin and held by the clamping yoke 214, it projects beyond this tube at opposite ends thereof. These projecting portions are then each disposed within an enclosure which includes means for crimping the opposite projecting ends of the canister to seal the latter, as indicated at 226 and 228. Each crimping means includes generally a male die section 230 and a female die section 232 which are movable transversely of the passageway through the transfer coffin in a direction toward each other, to thereby engage and crimp the ends of the canister together. These crimping dies are preferably operated by pressure fluid cylinders which may receive their fluid pressure from the reactor, or an independent source, as desired. Also associated with the transfer coffin 38 and in communication therewith, is a source of helium pressure (not shown), which may be derived either from the reactor gas coolant or independently thereof, and which is adapted to fill the transfer coffin with helium at a pressure slightly greater than the reactor vessel pressure, in order to insure that leakage will be toward the reactor pressure vessel.

It is seen therefore, that after an empty canister has been placed within the transfer coffin 38, from a position within the storage compartment 40, the transfer coffin is moved along the rails 190, 190a to a position directly beneath the reactor discharge passage 172. The pneumatically operated seals 219 and 221 are closed and pressurized gas, such as helium, is then introduced into the coffin tube 204, at slightly greater than reactor pressure, to purge the coffin tube of air and minimize any outward leakage of radioactive fission product gases during the subsequent transfer operation. The flow of helium into the reactor is maintained during the subsequent period of time when the reactor vessel is open to the coffin 38. The upper and lower ball valves 218 and 220 are then opened and the isolation valve 176 at the lower end of the discharge tube is also opened after the confin 38 is thus in place. The telescopic piston 180 is then moved upwardly through the transfer coffin and discharge tube into the discharge passage 36, in a position of engagement with the lower end of a fuel element or rod which is being held at its upper end by the grappler mechanism 84 (FIG. 2). The grappler is released and the telescopic piston 180, etc., is retracted to lower the fuel element downwardly through the discharge tube 172 and into the canister 206 within the transfer coffin. The lower end of the fuel element comes to rest on the ledge provided by the annular groove 216 adjacent the lower end of the canister, as seen in FIG. 28. The isolation valve 176 (FIG. 15) at the lower end of the discharge tube 172 is then closed and, also, the ball valve 218 at the upper end of the transfer coffin. The next operation is to seal the ends of the canister by moving the dies 230 and 232 (FIG. 20) of the crimping mechanism against the canister so as to collapse the tube. The coffin is then purged of helium which is returned to the helium clean-up system and the entire unit including the canister is depressurized and filled with air to atmospheric pressure through suitable means (not shown). The transfer coffin 38 is now in readiness for movement through the lead shield doors 196 (FIGS. 13 and 14) that isolate the transfer room from the storage compartment 40.

In the storage compartment there is provided means for unloading the canister containing the spent fuel element and for storing it under water until the radiation level of the element has decreased sufficiently to permit further processing.

More particularly, as seen in FIGS. 13, 29 and 30, there is provided adjacent the ends of the transfer coffin track and along one wall of the storage tank 40, a canister raising and lowering means 240 which is adapted to lower the canister 206 from its position in the transfer coffin to a position within the storage tank 40. This canister raising and lowering mechanism includes a generally tubular receptacle 242 which is supported by a pair of cables 244 arranged around pairs of pulleys 246 and 248 at the upper and lower end, respectively, of the storage tank. The upper pulleys 246 are driven by a motor 250 (FIG. 29) so as to selectively position the tubular receptacle 242 in underlying relation to the transfer coffin. When the receptacle 242 is disposed directly below the transfer coffin, as indicated in dotted lines in FIG. 29, the clamping mechanism 208 (FIG. 21) in the latter is actuated to release the canister and permit it to fall into the underlying receptacle. The receptacle 242 includes a cushioning means, such as a spring 252 (FIG. 29), to minimize the shock as the canister is dropped into the receptacle. The receptacle is then lowered into the water and the transfer coffin 38 is in readiness to receive another canister.

It will be understood, of course, that the operation of the transfer coffin 38, the fuel raising and lowering mechanism 170, and the canister raising and lowering mechanism 240 are suitably remotely controlled in any known manner (not shown). In the illustrated embodiment the floor of shield material overlying the storage compartment includes removable sections 254 (FIG. 13) which permits lowering of new elements and rods, as well as canisters, into the transfer coffin. Moreover, when the spent fuel elements are ready for reprocessing or other disposal they can be removed through the openings provided for by the removable floor sections.

The introduction of new fuel elements or control rods into the reactor core 24 is achieved in generally the reverse manner of that described above with respect to unloading. As the coffin 38 containing the element is positioned below the reactor discharge tube 172, the fuel raising and lowering mechanism 170 will move through the open valve 220 (FIG. 20) and engage the element to move the latter upwardly past the open ball valve 218 and isolation valve 176 into the fuel element transfer passage 36 in the reactor vessel. During the transfer of the fuel element from the coffin 38 to the reactor vessel 12, the coffin is subjected to helium pressure in excess of that present in the vessel to prevent leakage outwardly of the vessel. As the new element is raised to a position projecting above the discharge passage 36, the pick-up mechanism 34 is operated to engage the upper end of the element, withdraw it from the discharge passage 36, and deposit the element in an available opening in the reactor core 24. The pick-up mechanism is then retracted into its housing 46 and isolation valves 52 and 176 are closed to thereby place the reactor in condition for operation.

As indicated previously, the described loading and unloading mechanism is not only utilized in connection with fuel elements but also with the control rods positioned within the reactor. In the illustrated embodiment, the control rods are operated by suitable drive means 44 located below the vessel (FIGS. 1 and 31) and which is effective to selectively move the rods from a position below the reactor core 24 to a position fully within the core. The control rods may be of any suitable neutron-absorbing material, such as boron carbide in graphite.

As seen in FIG. 32, the control rod 280 is disposed within a graphite sleeve 282 which is encased in a stainless-steel fluted jacket 284. During operation, the control rod 280 is movable relative to the graphite sleeve 282, as shown in the drawing. When it is desired to replace the control rod, the latter is locked in position relative to its sleeve and uncoupled from the control rod drive mechanism 44. The sleeve bearing the control rod may then be engaged by grappler mechanism 84, at a reduced neck portion 286 adjacent the upper end of the steel jacket, and removed in the manner described with respect to the fuel element.

In order to provide a proper understanding of the means whereby the control rod 280 is freed of its drive mechanism and locked in its graphite lined jacket for removal from the reactor core, a brief explanation of the control rod drive mechanism will be offered. With reference particularly to FIGS. 32, 34 and 36, it will be seen that the means for moving the control rod vertically with respect to the reactor core 24 is encased in a tubular housing 290, comprising a plurality of telescoping and abutting sections, which extends from a position within the bottom reflector in the reactor vessel downwardly through the vessel, terminating in a motor drive unit 292 at its lower end. The drive unit is connected with a drive screw 294 (FIG. 36) which extends upwardly in the housing 290 and engages a lower tubular section 296. The latter is connected at its upper end with a second tubular section 298 which in turn is connected at its upper end with an upper tubular section 300 having an upper section 302 of reduced cross section which extends from the upper end of the drive housing 290 into a bore or passage 304 (FIG. 32) in the bottom reflector for the reactor core. The leading end of tube 302 includes an internal shoulder section 306 (FIG. 33) which is supportingly connected with control rod 280 through a sleeve 308 which extends into an end portion 310 of the control rod.

Thus it is seen that operation of the motor drive unit is effective to provide for vertical movement of the control rod 280 relative to its sleeve 282, when the control rod is free within the sleeve, and to move the control rod and the metal clad sleeve as a unit when the two are locked together, as during insertion or withdrawal of the control rod from the core. There is, of course, also provided means for scramming the control rod into full position within the core, including fluid pressure lines 312, 314 and 316 shown in FIG. 36, when instantaneous insertion of the control rods is desired. However, since the latter feature is more fully described and claimed in the copending Fortescue et al. application Serial No. 753,770, now Patent No. 3,031,397, issued on April 24, 1962, assigned to the assignee of the present invention, it is believed unnecessary to give a more detailed explanation of the fluid pressure control rod actuating means herein.

With reference particularly to FIG. 33, it will be noted that there is provided locking mechanism for effectively detachably securing the control rod drive means to the lower end 310 of the control rod 280. As indicated in the drawings, the control rod end portion 310 comprises four tapered prong-like sections 318 surrounding a downwardly projecting central rod section 320 of reduced cross section. The latter is provided with an annular groove 321 adjacent its lower end, in position to receive a plurality of balls 322 retained in sleeve 308 and comprising part of the control rod gripping mechanism. The sleeve 308 at the upper end of the control rod drive is adapted to fit within the prongs 318 in encircling relation to the rod section 320, and sleeve 308 is provided at its upper end with an internal annular groove 324 affording means for movement of the balls 322 outwardly from their position of engagement with the groove 321 in the projecting end 320 of the control rod.

As seen in FIG. 33, the sleeve 308 is disposed in operative relation to the control rod 280 and the two are locked together by retention of the balls 322 in groove 321 through means of an inwardly facing shoulder portion 326 at the upper end of a collar 328 surrounding the sleeve 318. The collar 328 is seated on the upper end of tubular member 302 during operation of the control rod drive means, but relative movement between these parts is provided by a slot 330 in sleeve 308 through which there extends a pin 332 secured to the collar 328. Consequently, upward movement of collar 328 will position the internal groove 324 opposite the balls 322, thereby permitting movement of the balls outwardly from the groove 321 in the control rod upon upward movement of the latter. The upward motion of collar 328 necessary to effect release of the control rod from its drive mechanism is provided for by a central shaft 334 which is positionable to engage the sleeve 308 at its upper end. The shaft 334 extends downwardly through the hollow central portions of tube 302, tube 300 (FIG. 34) and tube 298 (FIG. 36) and includes a threaded end portion 335 projecting below a coupling 336 which secures the latter two tubular members together. A spacer 338 is positioned on the lower end of the shaft 334 and a fixed flange 342 on the shaft, which is normally seated on the upper end of coupling 336, cooperates with a nut 344 below the spacer to hold the upper end of the shaft in the position seen in FIG. 33. When it is desired to release the control rod 280 from its drive means, the nut 344 is unscrewed sufficiently to permit raising the shaft 334 (FIG. 33) so as to move sleeve 308 to position groove 324 opposite the locking balls 322. Upward movement of the control rod 280 will cam the balls 322 out of groove 321 on the control rod and into groove 324 to permit free upward movement of the control rod.

Before withdrawing the control rod assembly from the core 24, it is necessary to lock the control rod 280 in its metal clad graphite sleeve 282 so that the two may be raised as a unit. This is accomplished by raising the control rod within the sleeve, through use of the control rod drive means, to a position such that the T-shaped head 350 at the upper end of the control rod passes through a complementary T-shaped passage 352 in the sleeve and then rotating the rod so that the head 350 rests on shoulder portions 354 in the sleeve. When the rod is thus located in the sleeve 282, the openings provided between prongs 318 at the lower end of the control rod are disposed to permit buttons 356 in sleeve 282 to move inwardly of the latter and out of the recesses 358 in the reflector, to thereby release the sleeve from the reflector. The entire control rod unit can then be withdrawn from the core, in the manner previously described, through use of the pick-up mechanism 34.

Although shown and described with respect to particular apparatus, it will be apparent to those skilled in the art that various modifications of the described structure might be made without departing from the principles of the present invention.

We claim:

1. In a neutronic reactor including a vessel defining a pressurized zone, said vessel having an opening in the upper wall thereof, a reactor core disposed in the lower portion of said zone and a plurality of elongated fuel and control rod elements disposed in a generally vertical parallel relation within said core, the combination comprising a mechanism including a vertical housing rotatably mounted above said vessel opening, a pick-up mechanism disposed in said housing including an upper extensible and retractable support structure together with grappler actuating mechanical linkage, a lower terminal grappler means adapted to selectively engage one of said elements, and a collapsible suspension for said grappler means including paired support members pivotally attached to said support structure and coupled to the grappler actuating linkage of said pick-up mechanism, whereby said grappler may be displaced radially within said vessel; means defining a transfer passage in the vessel adjacent said core and leading downwardly and externally of said vessel; transfer means disposed beneath the lower end of said transfer passage, said transfer means including a support arranged for movement into said passage and adapted to engage an element suspended therein by said pick-up mechanism; and valve means coupled between said vessel opening and said housing and between said transfer passage and said transfer means, said valve means being operable to seal off the reactor vessel from said pick-up mechanism and transfer means, respectively.

2. In a neutronic reactor including a vessel defining a pressurized zone, said vessel having an opening in the upper wall thereof, a reactor core disposed in the lower portion of said zone and a plurality of elongated fuel and control rod elements disposed in a generally vertical parallel relation within said core, the combination comprising a mechanism including a vertical housing rotatably mounted above said vessel opening, a pick-up mechanism disposed in said housing including an upper extensible and retractable support structure together with grappler actuating mechanical linkage, a lower terminal grappler means adapted to selectively engage one of said elements, and a collapsible suspension for said grappler means including paired support members pivotally attached to said support structure and coupled to the grappler actuating linkage of said pick-up mechanism, whereby said grappler may be displaced radially within said vessel; means defining a transfer passage in the vessel adjacent said core and leading downwardly and externally of said vessel, transfer means disposed beneath the lower end of said transfer passage, said transfer means including a support arranged for movement into said passage and adapted to engage an element suspended therein by said pick-up mechanism, said transfer means also including a movable coffin positioned beneath said transfer passage to receive one of said elements; and valve means coupled between said vessel opening and said housing and between said transfer passage and said transfer means, said valve means being operable to seal off the reactor vessel from said pickup mechanism and transfer means, respectively.

3. In a neutronic reactor including a generally vertical cylindrical vessel defining a pressurized zone, said vessel having a central opening in the upper wall thereof a reactor core disposed in the lower portion of said vessel and having a plurality of vertically oriented parallel channels and a plurality of fuel and control rods disposed in said channels, the combination comprising a pick-up mechanism including a housing rotatably mounted above said vessel opening; a plurality of telescoping members disposed in said housing and supported by bearing means providing rotation of said members therein with at least one of said members being disposed for movement in an axial direction for vertical movement into and withdrawal from said vessel through said opening; a grappler head; a collapsible parallel support member suspension for said grappler head pivotally attached to the lower end of said one vertically movable telescoping member and providing radially outward movement of said head with a maintained substantially constant vertical positioning thereof; a mechanical linkage coupling one of said telescoping members with the pivotal suspension of said grappler and actuated by axial movement of said telescoping member to produce a correlated radial movement of said grappler head within said vessel; drive means connected with said telescoping members for moving said telescoping members relative to one another and for moving said telescoping members and grappler head as a fixed unit relative to said housing; and valve means disposed between said housing and said vessel for sealing off said pressurized zone from said housing.

4. In a neutronic reactor including a generally vertical cylindrical vessel defining a pressurized zone and provided with an axial opening in the upper surface thereof, a reactor core disposed in the lower portion of said vessel, said core having a plurality of vertically oriented parallel channels and a plurality of fuel and control rods disposed in said channels, the combination comprising a pick-up mechanism including a housing rotatably mounted above said vessel and in communication with the interior thereof through said axial opening; a plurality of telescoping members disposed within said housing and supported by bearing means permitting rotation therein with at least one of said members being arranged for axial movement within said housing and through said opening into said vessel; a grappler head; a collapsible parallel support member suspension for said grappler head pivotally attached to the lower end of said one telescoping member which is arranged for axial movement, said suspension providing radially outward movement of said head and a maintained constant vertical positioning thereof; a mechanical linkage coupling one of said telescoping members with the pivotal suspension of said grappler and actuated by axial movement of said member to produce a correlated radial movement of the grappler head in said vessel; drive means connected with said telescoping members for moving said telescoping members relative to one another and for moving said members and grappler head as a fixed unit relative to said housing; and valve means disposed between said housing and said vessel for sealing off said pressurized zone from said housing.

5. In a neutronic reactor including a generally vertical cylindrical vessel defining a pressurized zone and provided with an axial opening in the upper surface thereof, a reactor core disposed in the lower portion of said vessel and having a plurality of vertically oriented parallel channels and a plurality of fuel and control rods disposed in said channels, the combination comprising a pick-up mechanism including a housing rotatably mounted above said vessel and in communication with the interior thereof through said axial opening; a plurality of telescoping members disposed within said housing and supported by bearing means permitting rotation therein with at least one innermost of said members being arranged for axial movement within said housing and through said opening into said vessel; means for effecting relative axial movement of said telescoping members; additional means for effecting axial movement of said telescoping members as a unit relative to said housing; driving means for rotating said telescoping members about their axis; a grappler mechanism having a pair of tongs for engaging an end of one of said elements; a collapsible parallel support member suspension for said grappler mechanism pivotally supported upon the lower end of said innermost telescoping member; a mechanical linkage coupled to said suspension pivoted on said innermost member and to another of said telescoping members and adapted to translate relative axial movement of said members into radial movement of said grappler; an annular member supported by said grappler and including lower surfaces adapted to engage adjacent element ends thereby to center said tongs to grasp a selected element end; means for effecting relative axial movement of said tongs and annular member and for opening and closing said tongs; and valve means disposed between said housing and said vessel for sealing off said pressurized zone from said housing.

6. In a neutronic reactor including a generally vertical cylindrical vessel defining a pressurized zone and provided with an axial opening in the upper surface thereof, a reactor core disposed in the lower portion of said vessel and having a plurality of vertically oriented parallel channel and a plurality of fuel and control rods disposed in said channels, the combination comprising a pick-up mechanism including a housing rotatably mounted above said vessel and in communication with the interior thereof through said axial opening; a plurality of telescoping members disposed within said housing and supported by bearing means permitting rotation therein with at least one innermost of said members being arranged for axial movement within said housing and through said opening into said vessel; means for effecting relative axial movement of said telescoping members; additional means for effecting axial movement of said telescoping members as a unit relative to said housing; driving means for rotating said telescoping members about their axis; a grappler mechanism having a pair of tongs for engaging an end of one of said elements; a collapsible parallel support member suspension for said grappler mechanism pivotally supported upon the lower end of said innermost telescoping member; a mechanical linkage coupled to said suspension pivoted on said innermost member and to another of said telescoping members and adapted to translate relative axial movement of said members into radial movement of said grappler; an annular member supported by said grappler and including lower surfaces adapted to engage adjacent element ends thereby to center said tongs to grasp a selected element end; means for effecting relative axial movement of said tongs and annular member and for opening and closing said tongs; power operated control means for said pick-up mechanism including a position indicating means on said grappler operative to indicate the positioning of said tongs relative to said selected rod element and prevent retraction of said grappler when not fully engaged therewith.

7. Apparatus as defined in claim 6 wherein said telescoping members are three in number the outermost of which is supported by said bearing means permitting rotation within said housing.

8. Apparatus as defined in claim 6 wherein said telescoping members are three in number the outermost of which is supported by said bearing means permitting rotation within said housing, and wherein said means for effecting relative axial movement of said telescoping members includes a power driven pinion disposed upon said housing and a rack disposed upon said outermost telescoping member and engaged by said pinion.

9. Apparatus as defined in claim 6 wherein said telescoping members are three in number the outermost of which is supported by said bearing means permitting rotation within said housing, and wherein said means for effecting relative axial movement of said telescoping members includes a power driven telescoping ball screw mechanism terminally mounted upon said outermost telescoping member and coupled to said innermost telescoping member and a power driven pinion disposed upon said housing with a rack being disposed upon said outermost telescoping member and engaged by said pinion.

References Cited in the file of this patent

UNITED STATES PATENTS

| | | |
|---|---|---|
| 2,424,692 | Harshberger | July 29, 1947 |
| 2,584,836 | Blumensaadt | Feb. 5, 1952 |
| 2,708,656 | Fermi et al. | May 17, 1955 |
| 2,725,993 | Smith | Dec. 6, 1955 |
| 2,741,592 | Borst et al. | Apr. 10, 1956 |
| 2,852,458 | Dietrich et al. | Sept. 16, 1958 |
| 2,863,815 | Moore et al. | Dec. 9, 1958 |
| 2,885,893 | Lane et al. | May 12, 1959 |
| 2,890,158 | Ohlinger | June 9, 1959 |
| 2,936,273 | Untermeyer | May 10, 1960 |
| 2,949,202 | Treshow | Aug. 16, 1960 |
| 2,999,059 | Treshow | Sept. 5, 1961 |
| 3,044,947 | Payne | July 17, 1962 |
| 3,051,642 | Dent | Aug. 28, 1962 |
| 3,058,900 | Frisch | Oct. 16, 1962 |

FOREIGN PATENTS

| | | |
|---|---|---|
| 789,022 | Great Britain | Jan. 15, 1958 |
| 1,038,665 | Germany | Sept. 11, 1958 |
| 217,959 | Australia | Oct. 17, 1958 |

OTHER REFERENCES

Schultz: "Nucleonics," November 1956, page 138.

McLain et al.: Problems in Nuclear Engineering, vol. I, June 1957, pages 267–277, Permagon Press.

Dent et al.: J. Brit. Nucl. Energy Conf., April 1957, pp. 146–155.

Leo et al.: Proceedings of the Second International Conference on the Peaceful Uses of Atomic Energy, vol. 7, September 1958, pages 582–590.